United States Patent [19]

Heisel et al.

[11] Patent Number: 4,530,827
[45] Date of Patent: Jul. 23, 1985

[54] PROCESS FOR THE SIMULTANEOUS REMOVAL OF H₂S, SO₂ AND ELEMENTAL SULFUR FROM GASEOUS MIXTURES

[75] Inventors: Michael Heisel, Munich; Gerhard Ranke, Poecking, both of Fed. Rep. of Germany

[73] Assignee: Linde Aktiengesellschaft, Wiesbaden, Fed. Rep. of Germany

[21] Appl. No.: 545,427

[22] Filed: Oct. 26, 1983

[30] Foreign Application Priority Data

Oct. 26, 1982 [DE] Fed. Rep. of Germany ....... 3239603

[51] Int. Cl.³ ............................................. C01B 17/05
[52] U.S. Cl. .................. 423/575; 23/295 R; 55/73
[58] Field of Search ............... 423/575; 55/73; 23/293 S, 295 R

[56] References Cited

U.S. PATENT DOCUMENTS

| 2,987,379 | 6/1961 | Urban | 423/575 |
| 2,992,076 | 7/1961 | Thompson et al. | 423/575 |
| 3,149,920 | 9/1964 | Urban | 423/575 |
| 3,798,315 | 3/1974 | Nicklin | 423/574 G |
| 4,107,269 | 8/1978 | Rossarie et al. | 423/575 |
| 4,250,151 | 2/1981 | Johnson | 423/575 |
| 4,315,904 | 2/1982 | Lell et al. | 423/576 |

FOREIGN PATENT DOCUMENTS

| 2358186 | 3/1978 | France | 423/575 |
| 2719 | of 1908 | United Kingdom | 423/575 |
| 698870 | 10/1953 | United Kingdom | 23/295 |

OTHER PUBLICATIONS

Kirk-Othmer Encyclopedia of Chemical Technology, John Wiley & Sons, vol. 7, pp. 279-280, 3rd edition. "Hydrocarbon Processing", Apr. 1973, pp. 111-115 and 133.

Primary Examiner—Earl C. Thomas
Assistant Examiner—Jeffrey E. Russel
Attorney, Agent, or Firm—Millen & White

[57] ABSTRACT

A process for the simultaneous removal of H₂S, SO₂ and elemental sulfur from gaseous mixtures, comprises treating the gaseous mixture with a solvent. After the solvent becomes loaded with the components to be removed, it is regenerated and reused. In order to obtain savings in costs and energy, the sulfur is separated from the loaded solvent by lowering the temperature thereof. In this way, chemical regeneration of the scrubbing medium takes place within the cycle eliminating the requirement for outside regenerating apparatus.

22 Claims, 2 Drawing Figures

PROCESS FOR THE SIMULTANEOUS REMOVAL OF H₂S, SO₂ AND ELEMENTAL SULFUR FROM GASEOUS MIXTURES

BACKGROUND OF THE INVENTION

This invention relates to a process for the simultaneous removal of $H_2S$, $SO_2$ and elemental sulfur from gaseous mixtures by treating the gaseous mixture with a solvent. The solvent, after having been saturated with the components to be removed, is regenerated and reused.

Such a process is disclosed, for example, in DOS 2,931,046. This is employed primarily to remove high proportions of elemental and bound sulfur from the waste gases of plants operating by the Claus process. In these plants, hydrogen sulfide is converted into elemental sulfur for the manufacture of sulfur. Typically, the removal of elemental and bound sulfur is attained by admixing the aqueous scrubbing medium, i.e., solvent, with specific types of catalytic solids in finely divided form. More particularly, the gaseous waste stream is brought into intimate contact with an acidic, aqueous suspension of finely divided catalytic material such as aluminum oxide or active carbon. The acidity of the suspension is of the kind produced by absorption of acidic components from the gaseous stream. The formation of colloidal sulfur in the aqueous phase is prevented by adding the catalytic solid materials. The sulfur is thus deposited on the finely divided catalytic solids and can be removed therefrom by regeneration of the catalytic solids. In order to regenerate the catalyst, the finely divided material is separated from the aqueous medium and rinsed with a liquid solvent for sulfur, or with a gas inert to the material at temperatures effective to remove the sulfur by dissolution or melting. The thus-regenerated material is thereafter recycled in the form of an aqueous suspension.

By the use of this known method, sulfur, in substantially all its various forms, is effectively removed from a gaseous stream. However, a disadvantage of the process resides in that the regeneration of the catalyst slurry employed is very expensive.

SUMMARY OF THE INVENTION

It is thus an object of the present invention to provide a process of the type discussed above which can be operated in a simple and economical, as well as energy-saving manner, and which satisfies environmental protection rules by effecting a sufficient removal of sulfur and sulfur compounds from waste gases.

Other objects of the invention will be apparent to those skilled in the art to which this invention pertains.

In accordance with the invention, a solvent is employed and brought into contact with the feed gas to be treated at a temperature lower than that of the gas. The components to be removed are absorbed by the solvent and reacted to elemental sulfur. The temperature of the loaded solvent is then lowered until the solid, elemental sulfur is precipitated. The elemental sulfur is then separated from the solvent, and the cold solvent, freed of sulfur, is then recycled into the scrubbing stage wherein it is heated in a countercurrent flow with the gas to be treated.

The possible solvent is characterized by
good solubility for sulfur compounds, especially H₂S,
SO₂ elemental sulfur
stability against decomposition by above-mentioned sulfur compounds, especially by $SO_x$, by $NO_x$ Examples of possible solvents which are especially effective for use in the invention are an ether of polyethylene glycol as well as alcohols, ketones, N-methylpyrrolidone, dimethyl-formamide, glycols, aromatics, butyrolactone.

This invention is based on the realization that the solubility of elemental sulfur in the scrubbing liquid decreases with decreasing temperature, whereas the gas solubility in the scrubbing liquid will increase with the temperature decrease. Thus, the desired reaction product, i.e., sulfur, can be separated from the liquid by lowering of the temperature, without simultaneously driving off any residual gases, e.g., $H_2S$ and $SO_2$, still contained in the solvent. The residual components, e.g., $H_2S$ and $SO_2$, consequently have a long time available for being reacted to elemental sulfur and water in accordance with the following equation since they will be recycled to the scrubbing of the waste gases with the scrubbing liquid:

$$2 H_2S + SO_2 \rightleftharpoons 3/x S_x + 2 H_2O \tag{I}$$

It follows from this equation that for the reaction to occur, $H_2S$ and $SO_2$ must be present in the feed gas in a ratio of 2:1, as is the case with Claus waste gases. In the case of gaseous streams not containing the necessary stoichiometric amount of $SO_2$, external combustion of part of the product sulfur can be used to generate the necessary amount of $SO_2$ which is fed to the gaseous stream to be treated. Alternatively, the thus-produced $SO_2$ can be fed directly into the solvent.

The elemental sulfur is then precipitated in the solid phase whereby the chemical equilibrium is shifted further toward the right, i.e., toward sulfur formation. Additional $H_2S$ and $SO_2$ react in the scrubbing liquid to elemental sulfur so that the scrubbing liquid becomes depleted of the components $H_2S$ and $SO_2$.

Thus, a chemical regeneration of the scrubbing medium takes place within the cycle itself, as compared to conventional prior art methods wherein solvents are typically generated thermally and/or with a lowering of the pressure in a step outside of the actual scrubbing medium cycle.

In the process of this invention, no separate column is required for the regeneration of the solvent to obtain sulfur, as is otherwise generally the practice in the prior art chemical as well as physical scrubbing operations. The necessary operating media are thus also eliminated. However, in case of readily water-miscible solvents, distillatory separation of the reaction product, water, is generally necessary, the water having been produced typically in accordance with Equation I.

When the solvent is pumped back, after removal of elemental sulfur therefrom, into the scrubbing column, it is heated in direct heat exchange with the sulfur-containing gas. During this step, any $CO_2$ absorbed at the cold end of the column, as well as other inert gases, such as $N_2$, $CH_4$, are stripped off since the gas solubility is reduced with the rising temperature and the scrubbing liquid at that point is saturated with the inert substances and $CO_2$. Therefore, in the overall process, substantially no $CO_2$ or other inert gases are dissolved in the scrubbing liquid since no gaseous phase is released during the later conducted "regeneration", i.e., the separation of elemental sulfur by the lowering of the temperature. There is merely an increase in the saturation of the solvent with $CO_2$ and inert substances from the feed gases in the center of the scrubbing column, but since these materials are stripped off again at the bottom when the temperature increases, there are effectively no inert gases scrubbed out of the feed gas.

With respect to $H_2S$ and $SO_2$, these compounds are practically completely scrubbed out of the feed gas since they are not at the saturation limit within the scrubbing liquid due to the above-discussed reaction to elemental sulfur. Instead, the scrubbing liquid is capable of absorbing additional sulfur components from the sulfur-containing gas notwithstanding the increase in its temperature and consequent decrease in its gas solubility, i.e., especially with respect to $H_2S$ and $SO_2$.

In case the gas to be treated contains COS, and corresponding environmental protection regulations must be observed, the provision is made according to one embodiment of this invention to hydrolyze the COS prior to the scrubbing step. The resultant $H_2S$ can then be reconverted into elemental sulfur with $SO_2$ whereby the sulfur yield is enhanced.

It is particularly advantageous, according to another embodiment, to conduct the scrubbing step at temperatures of 10°–120° C., preferably between 40°–100° C. These temperatures are dependent, primarily, on the temperature of the gas to be purified, as well as on other requirements regarding the required gas purity. The purer the waste gas required, i.e., the lower its sulfur content, the lower the scrubbing temperature employed. Since the scrubbing temperature lies between the temperature of the gas and the temperature of the solvent, this scrubbing temperature is determined, in particular, by the degree of cooling effected on the loaded solvent. The loaded solvent, for separating the elemental sulfur, is preferably cooled to temperature of 20°–50° C., preferably 30°–40° C. This cooling is typically carried out by indirect heat exchange, so that the solid sulfur can be deposited on the heat exchanger surface.

As soon as a relatively large amount of solid sulfur has been deposited, as indicated by temperature increase in the scrubbing liquid exiting the heat exchanger and/or the increase in pressure drop of the scrubbing liquid flowing through the heat exchanger, the loaded solvent stream is switched over to another alreadly regenerated heat exchanger which is required to permit conducting the process continuously. The loaded heat exchanger is regenerated, and the sulfur melted off, for example, by steam, in indirect heat exchange, and fed through a siphon into a sulfur pit. Once the sulfur has been removed by melting, the heat exchanger is again cooled by a flow of the cooling medium therethrough and is then available for again cooling of the solvent and separation of sulfur. Thus, it is clearly apparent that at least two parallel-connected heat exchangers are required to conduct a continuous process. It is also possible for the elemental sulfur to be precipitated in solid form, as opposed to on the heat exchanger surfaces. In such a case, the sulfur is then recovered by conventional solid-liquid separating methods. The kind of precipitation effected in this solid form depends on the solvent chosen, especially on the size of sulfur crystals created which are different for different solvents.

It must be borne in mind that in accordance with the above-discussed Equation (I), water will also be formed during the reaction occurring between $H_2S$ and $SO_2$. Moreover, in Claus waste gases, water is also introduced, in relatively large amounts, into the scrubbing cycle by the gas to be treated. Thus, in order to shift the position of chemical equilibrium in the direction toward sulfur formation, this water must ultimately be removed from the scrubbing liquid. The solvent, by contact with wet feed gas, and by the reaction of $H_2S$ and $SO_2$ (Eq-I) takes up some water i.e., dissolves water in the solvent and removes it from the feed gas, and it is recommended that this water be separated as early as possible from the scrubbing liquid.

In order to effect this separation, a partial stream of solvent, i.e., about 10–50%, of the total scrubbing liquid, is branched off. In case of solvents having reduced miscibility with water, for example, toluene, it is desirable to separate the water, for example, by decanting, even before cooling the solvent for the purpose of freezing out solid sulfur. If the solvent is readily miscible with water, as in the case of polyethylene glycol ether, water is advantageously removed only after the separation of the solid sulfur from a partial stream of the solvent, for example, by distillation.

In order to perform the scrubbing step in an especially effective manner, an ether of polyethylene glycol is employed as the solvent. However, the invention is not to be restricted to this scrubbing medium. Instead, it is just as readily possible to employ other solvents such as alcohols, ketones, N-methylpyrrolidone, dimethylformamide, glycols, aromatics, butyrolactone.

In order to increase the speed of reaction of $H_2S$ or $SO_2$ into elemental sulfur, in a further development of the idea of this invention a catalyst is added to the solvent. Appropriate catalysts for use are liquid catalysts, for example, polyethylene glycol ether, as well as solid materials, for example, finely divided active carbon or aluminum oxide (alumina). The use of catalysts, in this connection, is known from the previously discussed DOS 2,931,046. However, in contrast to the process described in said document, the catalyst is not suspended in water, but instead in another, suitable solvent. In this invention, the elemental sulfur which settles on the surface of solid catalysts is redissolved during the heating of the solvent, which occurs in the scrubbing column. Thus, external regeneration as required in the method of DOS 2,931,046 is unnecessary in the process of this invention. Solid catalyst contained in the liquid sulfur, when the sulfur is melted off the heat exchangers, can then be recovered by filtration and returned into the scrubbing cycle.

Instead of then performing the entire heating step on the scrubbing liquid in the scrubbing column, it is also possible to first heat a portion, or the entire amount of the scrubbing liquid in indirect heat exchange prior to feeding to the column, during which step any elemental sulfur still deposited on the regenerated catalyst surface is dissolved in the solvent. After flowing through the scrubbing column, the solvent is cooled in the process cycle coolers. There the redissolved sulfur from the catalyst surface is recovered from the solvent, together with the sulfur formed routinely in the process.

This process, although requiring a greater expenditure in apparatus costs, provides the advantage that substantially less elemental sulfur is conducted in the recycled scrubbing medium cycle to the head of the scrubbing column. Thereby, the chemical equilibrium in the entire scrubbing column is favorably shifted further in the direction toward formation of elemental sulfur. The sulfur yield and the waste gas purity are thus improved.

As an alternative to admixing a finely divided catalyst with the solvent, it is also possible to introduce a catalytically active surface in the form of a solid bed into the scrubbing medium cycle., e.g. conventional porous $Al_2O_3$, promoted $Al_2O_3$ or activated carbon. The elemental sulfur deposited on such a surface can be rinsed off by flushing the solid bed with a scrubbing medium not saturated with elemental sulfur. Such a solvent can be obtained, for example, by branching off a partial stream from the cycle and heating the partial stream. The branched-off stream increases with increasing size of the solid catalytic bed and decreasing regeneration time.

During the flushing step, a parallel-connected solid bed will, of course, be provided for, conducting the catalytic reaction so that the process can be conducted continuously. Discontinuous operation may make sense in cases, where the feed gas or the content of sulfur compounds in the feed gas are available discontinuously. Example: Regeneration gas from absorbers for desulfurization of natural gas. In these cases the parallel—connected second solid bed may be omitted. Regeneration of the remaining bed is carried out while the upstream adsorbers are on-line, i.e. no sulfur and sulfur compounds reach the solid bed.

In order to extend the time between reversing cycles of the heat exchangers used for cooling the solvent to precipitate sulfur, it is also possible to pass the solvent withdrawn from the sump of the scrubbing column, prior to cooling, through a centrifuge, for example, and to conventionally separate the sulfur which has been already deposited at that point. Only thereafter will the solvent be cooled down for additional separation of sulfur.

The process of this invention is usable in the purification of all sulfur-containing gases and in sulfur recovery. It is especially suitable for the purification of Claus waste gases, but can also be employed for purifying $H_2S$-containing natural gases.

DETAILED DISCUSSION OF THE INVENTION

Figure 1:
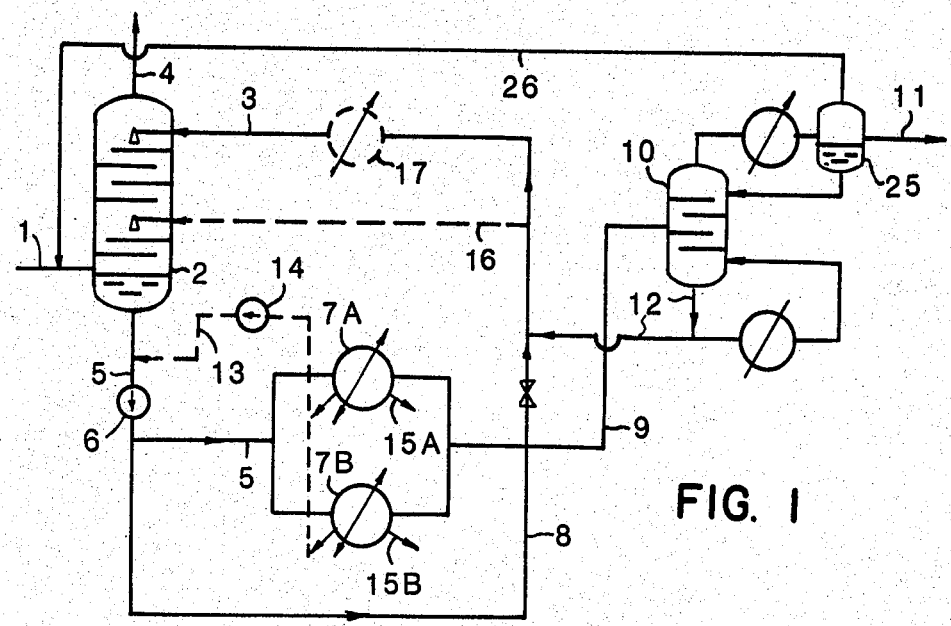
FIG. 1 is a schematic diagram illustration of a first embodiment of an apparatus for conducting the process of the invention.

In FIG. 1, sulfur-containing waste gas, for example, fed from a Claus plant, is introduced typically at a temperature of about 140° C., and under a pressure of 1.3 bar, through conduit 1 into a scrubbing column 2 from the bottom thereof. In the scrubbing column 2, the gas rises in countercurrent relation to a solvent fed through conduit 3 to the head of the scrubbing column 2 and is thereby cooled in direct heat exchange. At the same time, sulfur components, such as, for example, $H_2S$, $SO_2$, sulfur vapor, and sulfur droplets are scrubbed out and dissolved in the solvent. Only traces of these substances may leave the scrubber overhead. The thus-purified gas leaves the column overhead through conduit 4 at typically a temperature of about 40°-60° C. and at a pressure of about the feed gas pressure (minus the typical pressure drop in a scrubber, e.g. 10 to 500 mbar).

The solvent in introduced in the cold state, i.e., typically 40°-60° C. at the head of scrubbing column 2. In the scrubbing column the solvent is loaded with $CO_2$, $N_2$, and other inert gases from the gas to be treated. This is done according to the solubility, temperature, and partial pressure of these components. The loading with elemental sulfur and sulfur compounds reacting to elemental sulfur in the course of the process, is below the equilibrium loading, especially with respect to $H_2S$ and $SO_2$. Therefore, in all places of the column there is a tendency of these components to go from the gas phase to the solvent.

The solvent flows in the opposite direction of the gas from the top toward the bottom through the scrubbing column and is heated by the hot gas during this step. In addition, the solvent absorbs the heat of solution of the gas, heat from water condensation, heat of reaction from the reaction of $H_2S$ and $SO_2$, and heat from the sulfur condensation. Simultaneously, the solvent absorbs $CO_2$, $N_2$, and other inert gases, as well as sulfur vapor, sulfur droplets, and sulfur compounds. Due to the heating action, the gas solubility of the solvent is reduced, so that the saturation values for inert gases are quickly surpassed. Therefore, these gases are released and also leave the scrubbing column through conduit 4.

Sulfur, $H_2S$ and $SO_2$ are, however, below the equilibrium loading in the scrubbing liquid and therefore remain dissolved. As a result of the relatively high temperature in the lower portion of the scrubbing column, the solubility of elemental sulfur as well as the reaction velocity of $H_2S$ and $SO_2$ to elemental sulfur are increased. For this reason, solvent collects in the sump of the column, loaded almost to equilibrium with $H_2S$ and $SO_2$, as well as with elemental sulfur, at a relatively high temperature, for example, 70° C. Additional $H_2S$ and $SO_2$ react in the sump to elemental sulfur due to the residence time in the column sump which, for this purpose, is constructed as a reaction vessel which has a sufficiently large volume and which can optionally be equipped with an agitator to provide improved intermixing. The loaded solvent is finally discharged through conduit 5 from the sump of the scrubbing column after a residence time of 0.5-15 minutes, preferably 1-5 minutes. The residence time required depends on the temperature, the concentration of absorbed $H_2S$ and $SO_2$, on the solvent composition, on addition of liquid or solid catalyst and on the water content of the solvent.

The hot solvent, saturated with elemental sulfur, is then conveyed through a pump 6 to heat exchangers, for example, through the continuation of conduit 5 to the alternately operated exchangers 7A and 7B. In the heat exchangers 7A and 7B, the solvent is cooled to a temperature of, for example, 40° C., so that elemental sulfur is precipitated in solid form due to the decreasing solubility. The cooling temperature is determined such that the physical properties of the solvent, e.g. increase of viscosity, allow economic and safe operation, and that the required refrigerant is cheap, e.g. cooling water. Simultaneously, the solubility for gases, for example $H_2S$ and $SO_2$, rises as a result of the decreased temperature, so that the equilibrium pressure of the still absorbed gases is lower than in the sump of the scrubbing column. In order to prevent the precipitation of elemental sulfur in saturated solvent with elemental sulfur, an amount of hot solvent to bring the solvent to a condition below saturation with respect to elemental sulfur, can be admixed to the cold solvent through conduit 8 in order to suppress the recipitation of additional elemental sulfur in the pipelines of the system or at the top of the scrubbing column. The cold solvent then returns through conduit 3 to the scrubbing column 2.

A partial stream of the solvent, for example, 30% of the entire amount circulated can be branched off from the cold solvent through conduit 9 and fed into a distillation column 10 for water separation. The portion branched off has to be at least as big as to ensure sufficient solubility of sulfur and sulfur compounds in the scrubber column 2 after mixing of regenerated and unregenerated solvent, since increasing water content in the solvent decreases solubility of sulfur and sulfur compounds. Steam is withdrawn from the head of the column 10 and purified solvent is discharged at the sump through conduit 12 and fed to the main solvent stream. The purified solvent is then conducted through conduit 3 to the head of the scrubbing column 2 and serves here for the fine purification of the gaseous stream. The steam is passed to a separator 25 wherein gases driven out of the solvent during the heating step in column 10 are separated from the solvent in a separator 25 and admixed to the raw gas via conduit 26 and the water is discharged through conduit 11.

If one of the two heat exchangers, for example 7A, becomes plugged with solid elemental sulfur, a switchover is performed to the parallel-connected, other heat exchanger 7B to conduct cooling of the solvent. The solvent in heat exchanger 7A is pumped back into the scrubbing cycle through conduit 13 by means of pump 14. Thereafter, the heat exchanger is then shut off from the cycle and heated indirectly, for example, with low-pressure steam, so that during this step, the sulfur melts off at temperatures of about 120° C. and can be conveyed in the usual way in the liquid phase through a conduit 15A through a siphon to a sulfur pit. The same occurs, as will be readily apparent, through conduit 15B when heat exchanger 7B is employed to conduct cooling of solvent. Once substantially all of the sulfur has been melted off, the heat exchanger is then again cooled by the cooling medium, e.g., cooling water, and is again available for reloading with solid elemental sulfur. The same procedure can be followed when heat exchanger 7B becomes plugged with elemental sulfur.

During melting of the sulfur, solvent and water dissolved in the sulfur can be vaporized if the vapor pressure of the solvent employed is sufficiently high. The thus-vaporized solvent can preferably be introduced into the water exclusion system (column 10) or it can be condensed and reintroduced into the cycle through pump 14 as discussed above. The consumption of operating medium is reduced by this solvent recovery. At the same time, purified sulfur is also obtained as the product.

If the sulfur purity of the waste gas from scrubbing column 2 does not satisfy minimum requirements, the sulfur content can be further reduced by modifying the scrubbing method. For example, it is possible to maintain at the head of scrubbing column 2 a small solvent cycle with cold solvent not saturated with sulfur-containing gases. This version is indicated by the dashed line 16, and the cooler 17, also shown in dashed lines.

A partial stream of the solvent is fed to the middle portion of the scrubbing column 2 through conduit 16. This partial stream effects cooling and preliminary purification of the sulfur-containing gas. The residual amount of solvent is fed to the upper portion of the scrubbing column through conduit 3. This partial amount stream is also precooled at cooler 17 to thus increase its gas solubility. The residual content of sulfur-containing gas components is then scrubbed out in the upper portion of the scrubbing column. This procedure is conventional practice in scrubbing processes.

Figure 2:
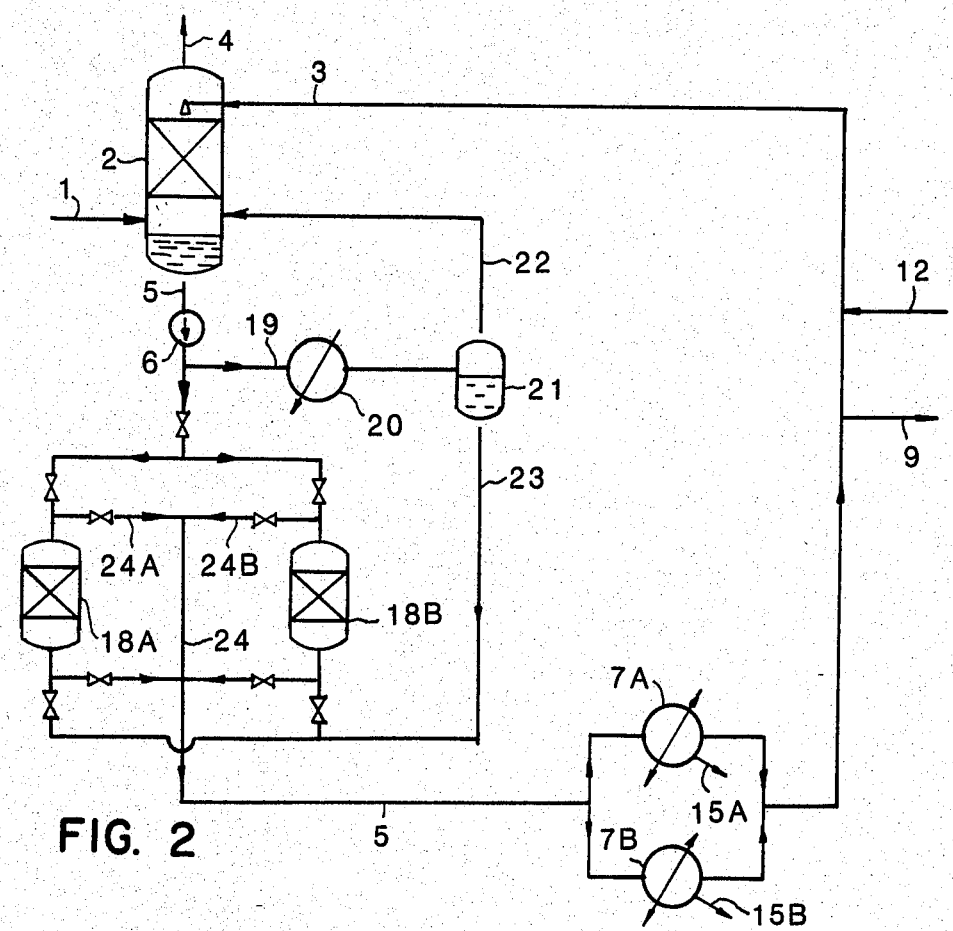
FIG. 2 is an alternative embodiment of the invention employing a solid catalyst bed.

The embodiment illustrated in FIG. 2 is similar to that of FIG. 1, the primary difference being that the solvent, prior to entering the heat exchangers 7A and 7B, passes through a solid catalytic bed 18A and 18B wherein the reaction of $H_2S$ and $SO_2$ to elemental sulfur is enhanced. In this Figure, identically numbered elements as those of FIG. 1 are the same as those of FIG. 1.

In this embodiment, the solvent passes, for example, into the solid catalytic bed 18A which can be, e.g., activated carbon or aluminum oxide. During the reaction to elemental sulfur, solid sulfur settles on the catalytically active surface of the bed, thereby raising the pressure drop across the bed and impairing the effectiveness of the catalyst. Once the pressure drop exceeds a predetermined value, the solid bed must be regenerated. To effect regeneration, solvent containing elemental sulfur at below the saturation point is utilized. Such a solvent is obtained, for example, by removing a partial stream, e.g., 10% of the cycle stream, from the scrubbing medium cycle downstream of pump 6 through conduit 19 and heating it in a heater 20. During this step, the gas solubility drops, and consequently a certain amount of gas will escape from the partial solvent stream. At the same time, solubility for elemental sulfur is increased. The gas is separated in a separator 21 and returned through conduit 22 into the lower portion of the scrubbing column. The liquid discharged from separator 21 is pumped through conduit 23 through the solid bed 18A to be regenerated, with the flow direction being preferably in opposition to the flow during normal operation. The bed regeneration solvent, which is then substantially saturated with elemental sulfur, is admixed through conduits 24A and 24 with the scrubbing medium stream leaving the solid bed 18B, which, in this case, is maintained in normal operation. From this mixed stream, solid sulfur is then recovered in the heat exchangers. The same procedure applies if the solid bed 18B becomes clogged with solid sulfur, in this case conduit 24B being used.

Without further elaboration, it is believed that one skilled in the art can, using the preceding description, utilize the present invention to its fullest extent. The following preferred specified embodiments are, therefore, to be construed as merely illustrative and not limitative of the remainder of the disclosure in any way whatsoever.

Numerical example:

A raw gas having the following composition is fed to a system in accordance with the invention, with different solvents being employed:

| Raw Gas (Claus Waste Gas) | | |
| --- | --- | --- |
| $CO_2$ | 42.48 vol-% | 315.6 Kmol/h |
| $N_2$ | 39.82 vol-% | 295.9 Kmol/h |
| $H_2S$ | 0.66 vol-% | 4.9 Kmol/h |
| $SO_2$ | 0.33 vol-% | 2.5 Kmol/h |
| $H_2O$ | 16.71 vol-% | 124.2 Kmol/h |
| Total | 100 vol-% | 743.1 Kmol/h |

Pressure: 1.3 bar
Temperature: 140° C.

EXAMPLE I

Treatment is with toluene as solvent.

About 163 tons per hour of cycle toluene is required for scrubbing of the raw gas. The toluene is fed at the head of the scrubbing column at 30° C. and is warmed to 50° C. by gas cooling, heat of solution of the gas, heat of reaction, and heat of condensation of sulfur and water.

The pure gas withdrawn from the head of the scrubbing column has the following composition:

| | | |
|---|---|---|
| $CO_2$ | 49.63 vol-% | 315.6 Kmol/h |
| $N_2$ | 46.53 vol-% | 295.9 Kmol/h |
| $H_2O$ | 3.84 vol-% | 24.4 Kmol/h |
| $H_2S$ | 10 vppm | ≃0 |
| $SO_2$ | 10 vppm* | ≃0 |
| Total | 100 vol-% | 635.9 Kmol/h |

*stoichiometric value: 5 vppm

Pressure: 1.2 bar
Temperature about 40° C.
vppm = parts per million by volume 7.4 Kmol/h of solid sulfur are removed from the solution. The condensed water and the water produced during the reaction are removed in a decanter.

Since $SO_2$ is substantially less toxic than $H_2S$, some excess $SO_2$ is provided in the waste gas, to ensure reaction of a maximum of $H_2S$.

EXAMPLE II

Treatment is with polyethylene glycol ether as solvent.

The solvent is introduced in an amount of 50% into the lower portion of the scrubbing column (prewashing step), the other 50% is fed at the head of the column (primary scrubbing step).

In the prewashing step, the raw gas is cooled to about 70° C., thus condensing about 70% of the water from the raw gas. At the same time, the solvent is warmed to about 60° C. This portion of the solvent is fed to the water separating column where water is removed by distillation. Thereafter, this portion of the solvent is admixed to the loaded solvent of the primary scrubbing step. The total quantity is cooled to 30° C. for sulfur separation.

Cold solvent at 30° C. is introduced at the head of the scrubbing column. This solvent is heated to about 50° C. countercurrently to the gas prepurified in the prewashing step. The entire amount of circulated solvent is about 117 t/h.

The purified waste gas stemming from the abovementioned raw gas has the following composition:

| | | |
|---|---|---|
| $CO_2$ | 50.45 vol-% | 315.6 Kmol/h |
| $N_2$ | 47.31 vol-% | 295.9 Kmol/h |
| $H_2O$ | 2.24 vol-% | 14.0 Kmol/h |
| $H_2S$ | 7 vppm | ≃0 |
| $SO_2$ | 6 vppm | ≃0 |
| Total | 100 vol-% | 625.5 Kmol/h |

Pressure: 1.23 bar
Temperature about 40° C.

In the above examples, the amount of scrubbing medium can be reduced without affecting the efficiency of the installation by installing a cooling stage in the prewashing unit, removing part of the heat.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the simultaneous removal of $H_2S$, $SO_2$ and elemental sulfur from effluent gases of the type produced by plants operating on the Claus process, which process comprises scrubbing the gas with a solvent to absorb the components to be removed, regnerating the solvent and recycling regenerated solvent for reuse, the improvement comprising: continuously scrubbing the effluent gas countercurrently, with a solvent capable of dissolving $H_2S$, $SO_2$ and elemental sulfur and being stable against decomposition by sulfur compounds, said solvent being at a temperature lower than that of said gas, and reacting the absorbed $H_2S$ and $SO_2$ to form elemental sulfur and $H_2O$ thereby causing said solvent to be heated during said scrubbing; separating a partial stream of resultant loaded of solvent and continuously lowering the temperature thereof by an amount effective to precipitate solid, elemental sulfur therefrom, and continuously separating the elemental sulfur from the solvent to produce a regenerated solvent stream; mixing the remaining stream of heated loaded solvent with the resultant cooled partial stream of regenerated solvent to increase the solubility of elemental sulfur in the cooled regenerated solvent thereby suppressing precipitation of any sulfur in the resultant combined solvent stream; and recycling resultant cooled regenerated solvent, reduced in sulfur content and non-saturated with respect to $H_2S$ and $SO_2$, into the scrubbing step to again absorb components to be removed and be reheated in countercurrent flow to the hotter gases being treated.

2. In a process for the simultaneous removal of $H_2S$, $SO_2$ and elemental sulfur from effluent gases of the type produced by plants operating on the Claus process, which process comprises scrubbing the gas with a solvent to absorb the components to be removed, regenerating the solvent and recycling regenerated solvent for reuse, the improvement comprising: continuously scrubbing the effluent gas countercurrently with a solvent capable of dissolving $H_2S$, $SO_2$ and elemental sulfur and being stable against decomposition by sulfur compounds, said solvent being at a temperature lower than that of said gas and with said lower temperature of the solvent being 20°–50° C., and the temperature of the scrubbing step being a temperature intermediate to the temperature of the solvent and the temperature of the gas being introduced, and the scrubbing step temperature being 40°–100° C., and reacting the absorbed $H_2S$ and $SO_2$ to form elemental sulfur and $H_2O$ thereby causing said solvent to be heated during said scrubbing; separating a partial stream of resultant loaded solvent and continuously lowering the temperature thereof by an amount effective to precipitate solid, elemental sulfur therefrom, and continuously separating the elemental sulfur from the solvent to provide a regenerated solvent stream; mixing the remaining stream of heated loaded solvent with the resultant cooled partial stream of regenerated solvent to increase the solubility of elemental sulfur in the cooled regenerated solvent thereby suppressing precipitation of any sulfur in the resultant combined solvent stream; and recycling cooled regenerated solvent, reduced in sulfur content and unsaturated with respect to H$_2$S and SO$_2$, into the scrubbing step to again absorb components to be removed and be reheated in countercurrent flow to the hotter gases being treated.

3. A process according to claim 1, further comprising the preliminary step of hydrolyzing COS, which may be present in the gas, prior to the scrubbing step.

4. A process according to claim 1 wherein the scrubbing step is performed at a temperature of 10°–120° C.

5. A process according to claim 4 wherein said temperature is 40°–100° C.

6. A process according to claim 1, wherein the partial stream of loaded solvent, in the separation of elemental sulfur step, is cooled to a temperature of 20°–50° C.

7. A process according to claim 6, wherein the solvent is cooled, after effecting scrubbing, in indirect heat exchange.

8. A process according to claim 1 wherein a partial stream of the loaded solvent is separated after scrubbing, and water is removed from the partial stream of the loaded solvent.

9. A process according to claim 8 wherein said partial stream branched off, for removal of water, is 10–50% of the total solvent stream.

10. A process according to claim 8 wherein said partial stream branched off, for removal of water, is 20–30% of the total solvent stream.

11. A process according to claim 1 wherein the solvent is an ether of polyethylene glycol.

12. A process according to claim 1 further comprising passing the partial stream of loaded solvent, which is to have the temperature thereof lowered to precipitate solid elemental sulfur therefrom, in contact with a catalyst, effective to cause reaction of sulfur compounds in the gas stream to elemental sulfur.

13. A process according to claim 12, wherein a catalyst of finely divided activated carbon is added to the loaded solvent stream.

14. A process according to claim 12, wherein a catalyst of finely divided aluminum oxide is added to the loaded solvent stream.

15. A process according to claim 12, wherein the partial stream of loaded solvent is passed in contact with a catalyst of a solid bed catalyst in line in the process before having the temperature of the partial stream of loaded solvent lowered to precipitate solid elemental sulfur therefrom.

16. A process according to claim 1 wherein said solvent is one of an ether of polyethylene glycol, an alcohol, a ketone, N-methylpyrrolidone, dimethyl-formamide, a glycol, an aromatic, and butyrolactone.

17. A process according to claim 1 further comprising separating a partial stream of cooled regenerated solvent from the stream of cooled regenerated solvent, distilling said separated partial stream to separate water therefrom, and feeding said distilled regenerated solvent to the main stream of cooled regenerated solvent to be recycled to the scrubbing step.

18. A process according to claim 17 wherein the partial stream separated and fed to said distilling step is about 30% of the total stream.

19. A process according to claim 15 wherein the partial stream of loaded solvent from the scrubbing step, to have the temperature thereof lowered to precipitate solid elemental sulfur therefrom, is first passed through the solid catalytic bed for enhancing the reaction of H$_2$S and SO$_2$ to elemental sulfur, a third partial stream of the loaded solvent is separated from the main stream prior to passage through the catalytic bed and heated to decrease the gas solubility thereof and increase solubility to elemental sulfur, gas is separated in a separator and returned to the scrubbing step, and heated liquid solvent with reduced gas content is passed to the catalytic bed, when the bed becomes loaded with elemental sulfur, in a second direction countercurrent to the first direction in direct contact therewith to dissolve solid sulfur therein, and the thus-loaded solvent stream then being passed to said continuous temperature lowering step to precipitate solid elemental sulfur therefrom.

20. A process according to claim 19 wherein the third partial stream separated comprises about 10% of the cycle stream.

21. A process according to claim 2 wherein the partial stream of loaded solvent, to have the temperature thereof lowered, from the scrubbing step is passed in a first direction through the solid catalytic bed for enhancing the reaction of H$_2$S and SO$_2$ to elemental sulfur, a third partial stream of the loaded solvent is separated from the partial stream of loaded solvent prior to passage through the catalytic bed and heated to decrease the gas solubility thereof and increase solubility to element sulfur, gas is separated in a separator and returned to the scrubbing step and heated liquid solvent with reduced gas content is passed to the catalytic bed, when the bed becomes loaded with elemental sulfur, in a second direction countercurrent to the first direction in direct contact therewith to dissolve solid sulfur therein, and the thus-loaded solvent stream then being passed to said continuous temperature lowering step to precipitate solid elemental sulfur therefrom.

22. A process according to claim 1 wherein said partial stream of loaded solvent is regenerated by being cooled in first and second regenerators selectively connectable in line to a scrubbing means used in said contacting step, said loaded solvent being cooled in a first regenerator to cause elemental sulfur to separate from the solvent and when the first regenerator becomes loaded with sulfur, conducting said regeneration in the second regenerator and simultaneously removing the sulfur from the first regenerator by heating thereof, and when the second regenerator becomes loaded with sulfur again conducting regeneration in the first regenerator and removing the sulfur from the second regenerator.

* * * * *